US010929713B2

(12) United States Patent
Chiu et al.

(10) Patent No.: US 10,929,713 B2
(45) Date of Patent: Feb. 23, 2021

(54) SEMANTIC VISUAL LANDMARKS FOR NAVIGATION

(71) Applicant: SRI International, Menlo Park, CA (US)

(72) Inventors: Han-Pang Chiu, West Windsor, NJ (US); Supun Samarasekera, Skillman, NJ (US); Rakesh Kumar, West Windsor, NJ (US); Varun Murali, Princeton Junction, NJ (US)

(73) Assignee: SRI International, Menlo Park, CA (US)

( * ) Notice: Subject to any disclaimer, the term of this patent is extended or adjusted under 35 U.S.C. 154(b) by 72 days.

(21) Appl. No.: 16/163,273

(22) Filed: Oct. 17, 2018

(65) Prior Publication Data

US 2019/0114507 A1    Apr. 18, 2019

Related U.S. Application Data

(60) Provisional application No. 62/573,636, filed on Oct. 17, 2017.

(51) Int. Cl.
*G06K 9/62* (2006.01)
*G06K 9/72* (2006.01)
(Continued)

(52) U.S. Cl.
CPC ......... *G06K 9/6228* (2013.01); *G01C 21/165* (2013.01); *G01S 19/13* (2013.01);
(Continued)

(58) Field of Classification Search
CPC .. G06K 9/6228; G06K 9/00791; G06K 9/726; G06K 9/469; G06K 9/6296;
(Continued)

(56) References Cited

U.S. PATENT DOCUMENTS 9,031,809 B1    5/2015  Kumar et al.
2014/0309836 A1*  10/2014  Ollis ................ G01C 21/00
701/25

(Continued)

FOREIGN PATENT DOCUMENTS

WO    WO 2017172778    10/2017

OTHER PUBLICATIONS

Baatz et al., "Large Scale Visual Geo-Localization of Images in Mountainous Terrain," European Conference on Computer Vision, Springer-Verlag Berlin Heidelberg, Online ISBN 978-3-642-33709-3, 2012. (Applicant points out, in accordance with MPEP 609.04(a), that the year of publication, 2012, is sufficiently earlier than the effective U.S. filing date, so that the particular month of publication is not in issue.).

(Continued)

*Primary Examiner* — Qian Yang
(74) *Attorney, Agent, or Firm* — Shumaker & Sieffert, P.A.

(57) ABSTRACT

Techniques are disclosed for improving navigation accuracy for a mobile platform. In one example, a navigation system comprises an image sensor that generates a plurality of images, each image comprising one or more features. A computation engine executing on one or more processors of the navigation system processes each image of the plurality of images to determine a semantic class of each feature of the one or more features of the image. The computation engine determines, for each feature of the one or more features of each image and based on the semantic class of the feature, whether to include the feature as a constraint in a navigation inference engine. The computation engine generates, based at least on features of the one or more features included as constraints in the navigation inference engine, navigation information. The computation engine outputs the (Continued)

navigation information to improve navigation accuracy for the mobile platform.

23 Claims, 9 Drawing Sheets

(51) Int. Cl.
G06K 9/46 (2006.01)
G01C 21/16 (2006.01)
G01S 19/13 (2010.01)
G06K 9/00 (2006.01)
G06T 7/73 (2017.01)
G06T 7/20 (2017.01)

(52) U.S. Cl.
CPC ......... *G06K 9/00791* (2013.01); *G06K 9/469* (2013.01); *G06K 9/6202* (2013.01); *G06K 9/6296* (2013.01); *G06K 9/726* (2013.01); *G06T 7/20* (2013.01); *G06T 7/73* (2017.01)

(58) Field of Classification Search
CPC .. G06K 9/6202; G01C 21/165; G01C 21/206; G01S 19/13; G01S 19/48; G01S 5/16; G06T 7/73; G06T 7/20; G06T 2207/10021; G06T 2207/10028; G06T 2207/20072; G06T 2207/20076; G06T 2207/30248; G06T 2207/10016; G06T 2207/30244; G06T 7/162; G06T 7/277; G06T 7/246; G06T 7/77
See application file for complete search history.

(56) References Cited

U.S. PATENT DOCUMENTS

| | | | |
|---|---|---|---|
| 2015/0371440 A1 | 12/2015 | Pirchheim et al. | |
| 2017/0254660 A1* | 9/2017 | Panahandeh | G01C 21/3484 |
| 2018/0161986 A1* | 6/2018 | Kee | G06T 7/75 |
| 2019/0130603 A1 | 5/2019 | Sun et al. | |
| 2019/0353500 A1 | 11/2019 | Di Pietro et al. | |
| 2020/0088539 A1* | 3/2020 | Shashua | G05D 1/0246 |

OTHER PUBLICATIONS

Baatz et al., "Leveraging Topographic Maps for Image to Terrain Alignment," 2012 Second Joint Conference: 3D Imaging, Modeling, Processing, Visualization & Transmission, Oct. 13-15, 2012, 6 pp.
Badrinarayanana et al., "SegNet: A Deep Convolutional Encoder-Decoder Architecture for Robust Semantic Pixel-Wise Labelling," CVPR, Nov. 14, 2014, 10 pp.
Bansal et al., "Geometric Urban Geo-Localization," Computer Vision Foundation, Jun. 23-28, 2014, 8 pp.
Barrow et al., "Parametric Correspondence and Chamfer Matching: Two New Techniques for Image Matching," Proceedings of the Fifth International Joint Conference on Artificial Intelligence (ii), Contents vol. 2, Aug. 22-25,1977, 10 pp.
Brostow et al., "Semantic object classes in video: A high-definition ground truth database," Pattern Recognition Letters, Elsevier, vol. 30, Issue 2, Jan. 15, 2009, 10 pp.
Calonder et al., "BRIEF: Binary Robust Independent Elementary Features," Proceedings of the 11th European Conference on Computer Vision, Sep. 5-11, 2010, 14 pp.
Chiu et al., "Class-Specific Grasping of 3D Objects from a Single 2D Image," IEEE International Conference on Intelligent Robots and Systems, Oct. 18-22, 2010, 7 pp.
Eigen et al., "Predicting Depth, Surface Normals and Semantic Labels with a Common Multi-Scale Convolutional Architecture," IEEE International Conference on Computer Vision, Dec. 7-13, 2015, 9 pp.
Engel et al., "LSD-SLAM: Large-Scale Direct Monocular SLAM," European Conference on Computer Vision, ECCV 2014, Sep. 6-12, 2014, 16 pp.
Farrell, "Aided Navigation GPS with High Rate Sensors," Electronic Engineering, McGraw-Hill, 0-07-149329-8, 2008, 553 pp. (Applicant points out, in accordance with MPEP 609.04(a), that the year of publication, 2008, is sufficiently earlier than the effective U.S. filing date, so that the particular month of publication is not in issue.).
Feiner et al., "A Touring Machine: Prototyping 3D Mobile Augmented Reality Systems for Exploring the Urban Environment," Research Gate, Dec. 1997, 10 pp.
Felzenszwalb et al., "Distance Transforms of Sampled Functions," Theory of Computing, vol. 8, Sep. 2, 2012, 15 pp.
Harris et al., "A Combined Corner and Edge Detector," Proceedings of the Fourth Alvey Vision Conference, 5 pp. (Applicant points out, in accordance with MPEP 609.04(a), that the year of publication,1988, is sufficiently earlier than the effective U.S. filing date, so that the particular month of publication is not in issue.).
Laina et al., "Deeper Depth Prediction with Fully Convolutional Residual Networks," IEEE International Conference on 3D Vision, Jun. 2016, 12 pp.
Levinson et al., "Robust Vehicle Localization in Urban Environments Using Probabilistic Maps," IEEE International Conference on Robotics and Automation, May 3-8, 2010, 7 pp.
Luo et al., "Geotagging in Multimedia and Computer Vision—A Survey," Multimedia Tools and Applications, vol. 51, Issue 1, Jan. 2011, 19 pp.
Mastin et al., "Automatic Registration of LIDAR and Optical Images of Urban Scenes," Conference on Computer Vision and Pattern Recognition IEEE, Jun. 20-25, 2009, 8 pp.
Matei et al., "Image to LIDAR Matching for Geotagging in Urban Environments," IEEE Workshop on Applications of Computer Vision, Jan. 15-17, 2013, 8 pp.
Menozzi et al., "Development of Vision-aided Navigation for a Wearable Outdoor Augmented Reality System," IEEE Position, Location, and Navigation Symposium, PLANS 2014, May 5-8, 2014, 13 pp.
Mourikis et al., "A Multi-State Constraint Kalman Filter for Vision-aided Inertial Navigation," IEEE International Conference on Robotics and Automation, Apr. 10-14, 2007, 8 pp.
Mur_Artal et al., "ORB-SLAM: A Versatile and Accurate Monocular SLAM System," IEEE Transactions on Robotics, Aug. 24, 2015, 18 pp.
Newcombe et al., "DTAM: Dense Tracking and Mapping in Real-Time," International Conference on Computer Vision, Nov. 6-13, 2011, 8 pp.
Nister, "Preemptive RANSAC for Live Structure and Motion Estimation," Proceedings of the Ninth International Conference on Computer Vision, Oct. 13-16, 2003, 8 pp.
Oskiper et al., "Multi-sensor navigation algorithm using monocular camera, IMU and GPS for large scale augmented reality," ResearchGate, Nov. 2012, 11 pp.
Park., "Augmented Reality for Collision Warning and Path Guide in a Vehicle,".VRST'15, ACM, Nov. 13-15, 2015, 1 pp.
Tai et al., "Convolutional Neural Networks with Low-Rank Regularization," Computer Vision and Pattern Recognition Machine Learning, published online Cornell University Library, Nov. 19, 2015, 11 pp.
Arth et al., "Instant Outdoor Localization and SLAM Initialization from 2.5D Maps," IEEE Transactions on Visualization and Computer Graphics, Nov. 2015, 10 pp.
Chiu et al., "Constrained Optimal Selection for Multi-Sensor Robot Navigation Using Plug-and-Play Factor Graphs," IEEE International Conference on Robotics and Automation, May 31-Jun. 7, 2014, 8 pp.
Murali et al., "Utilizing Semantic Visual Landmarks for Precise Vehicle Navigation," IEEE 20th International Conference on Intelligent Transportation Systems, Oct. 16-19, 2017, 8 pp.
Sibley et al., "Sliding Window Filter with Application to Planetary Landing," Journal of Field Robotics, Jun. 21, 2010, 24 pp.

(56) References Cited

OTHER PUBLICATIONS

Roumeliotis et al., "Stochastic Cloning: A generalized framework for processing relative state measurements," Proceedings of the 2002 IEEE International Conference on Robotics & Automation, May 2002, 8 pp.
Triggs et al., "Bundle Adjustment—A Modern Synthesis," Vision Algorithms '99, LNCS, 75 pp. Lecture Notes in Computer Science, vol. 1883, pp. 298-375, Jan. 2000.
Dellaert, "Square Root SAM: Simultaneous Localization and Mapping via Square Root Information Smoothing," The International Journal of Robotics Research, vol. 25, No. 12, Dec. 2006, 23 pp.
Konolige et al., "FrameSLAM: From Bundle Adjustment to Real-Time Visual Mapping," IEEE Transactions on Robotics, vol. 24, No. 5, Oct. 2008, 12 pp.
Lupton et al., "Visual-inertial-aided navigation for High-Dynamic Motion in Built Environments without Initial Conditions," IEEE Transactions on Robotics, vol. 28, pp. 61-76, Feb. 2012.
Kaess et al., "iSAM2: Incremental smoothing and mapping using the Bayes tree," Intl. J. of Robotics Research, vol. 31, Feb. 2012, 19 pp.
Strasdat, "Which Landmark is Useful? Learning Selection Policies for Navigation in Unknown Environments," IEEE International Conference on Robotics and Automation, May 12-17, 2009, 6 pp.
Kschischang et al., "Factor graphs and the Sum-Product algorithm," IEEE Transactions on Information Theory, Jul. 27, 1998, 76 pp.
Forster et al., "IMU Preintegration on Manifold for Efficient Visual-Inertial Maximum-a-Posteriori Estimation," Jan. 2015, 20 pp.
Carlone et al., "Eliminating conditionally independent sets in factor graphs: A unifying perspective based on smart factors," in Proc. IEEE International Conference on Robotics and Automation (ICRA'14), 2014, pp. 4290-4297.
Kaess et al., "Concurrent Filtering and Smoothing," in Intl. Conf. on Information Fusion (FUSION), Jan. 2012.
Johannsson et al., "Imaging sonar-aided navigation for autonomous underwater harbor surveillance," in Proc. IEEE/RSJ International Conference on Intelligent Robots and Systems (IROS'10), 2010, pp. 4396-4403.
Indelman et al., "Information Fusion in Navigation Systems via Factor Graph Based Incremental Smoothing," Robotics and Autonomous Systems, vol. 61, Aug. 2013, 37 pp.
Kaess et al., "The Bayes Tree: An Algorithmic Foundation for Probabilistic Robot Mapping," in International Workshop on the Algorithmic Foundations of Robotics (WAFR'10), 2010, pp. 157-173.
Koller et al., "Probabilistic Graphical Models: Principles and Techniques," The MIT Press, 2009, 16 pp. (Applicant points out, in accordance with MPEP 609.04(a), that the year of publication, 2009, is sufficiently earlier than the effective U.S. filing date, so that the particular month of publication is not in issue.).
Carlone et al., "Lagrangian Duality in 3D SLAM: Verification Techniques and Optimal Solutions," Jul. 20, 2015, 10 pp.
Ranganathan et al., "Loopy SAM," in International Joint Conference on Artificial Intelligence (IJCAI'07), Jan. 2007, pp. 2191-2196.
Larsson et al., "A Multilevel Relaxation Algorithm for Simultaneous Localization and Mapping," IEEE Transactions on Robotics, May 2005, 12 pp.
Ni et al., "Tectonic SAM: Exact, Out-of-Core, Submap-Based SLAM," IEEE International Conference on Robotics and Automation, May 2007, 8 pp.
Folkesson et al., "Closing the loop with graphical slam," IEEE Transactions on Robotics, vol. 23, pp. 731-741, Aug. 2007.
Konolige, "Large-Scale Map-Making," AAAI National Conference on AI (AAAI'04), 2004, pp. 457-463, Jul. 2004.
Folkesson et al., "Graphical SLAM—a Self-Correcting Map," in Proc. IEEE International Conference on Robotics and Automation (ICRA'04), Apr. 2004, pp. 383-390.
Sukumar et al., "Sensor Selection Using Information Complexity for Multi-Sensor Mobile Robot Localization," in Proc. IEEE Intl. Conf. on Robotics and Automation (ICRA), Apr. 10-14, 2007, 7 pp.
Lu et al., "Globally Consistent Range Scan Alignment for Environment Mapping," Autonomous Robots, Kluwer Academic Publishers, vol. 4, Issue 4, pp. 333-349, Oct. 1997.
Huang et al., "An Observability-Constrained Sliding Window Filter for SLAM," Mars Lab, Technical Report 2011-0001, Feb. 2011, 15 pp.
Tardif et al., "A New Approach to Vision-Aided Inertial Navigation," IEEE/RSJ International Conference on Intelligent Robots and Systems, Oct. 18-22, 2010, 8 pp.
Julier et al., "A Counter Example to the Theory of Simultaneous Localization and Map Building," Proceedings 2001 ICRA. IEEE International Conference on Robotics and Automation May 21-26, 2001, 7 pp.
Van Der Merwe et al., "Sigma-point Kalman Filters for Nonlinear Estimation and Sensor Fusion: Applications to Integrated Navigation," in Proc. AIAA Guidance, Navigation and Control Conference, 2004, 31 pp.
Shamaiah et al., "Greedy sensor section: leveraging submodularity," n Proc. IEEE Intl. Conf. on Decision and Control (CDC), Dec. 15-17, 2010, 6 pp.
Oskiper et al., "Stable Vision-Aided Navigation for Large-Area Augmented Reality," Mar. 2011, 8 pp.
Li et al., "Vision-aided Inertial Navigation for Resource-constrained Systems," International Conference on Intelligent Robots and Systems, Oct. 7-12, 2012, 7 pp.
Rao et al., "On Fusers that Perform Better than Best Sensor," IEEE Transactions on Pattern Analysis and Machine Intelligence, vol. 23, No. 8, Aug. 2001, 6 pp.
Chiu et al., "Sub-Meter Vehicle Navigation Using Efficient Pre-Mapped Visual Landmarks," n Proc. IEEE International Conference on Intelligent Transportation Systems (ITSC'16), Nov. 2016, 8 pp.
Julier et al., "A New Approach for Filtering Nonlinear Systems," Proceedings of the American Control Conference, Jun. 1995, 5 pp.
Smith et al., "Approaches to Multisensor Data Fusion in Target Tracking: A Survey," IEEE Transactions on Knowledge and Data Engineering, vol. 18, No. 12, Dec. 2006, 15 pp.
Trinh et al., "A General Approach to Online Sensor Calibration for Navigation Using Factor Graphs," Institute of Navigation International Technical Meeting (ION'13), Jan. 2013, 9 pp.
U.S. Appl. No. 16/101,201, by SRI International. (Inventors: Chiu et al.), filed Aug. 10, 2018.

\* cited by examiner

SEMANTIC VISUAL LANDMARKS FOR NAVIGATION

This application claims the benefit of U.S. Provisional Application No. 62/573,636 by Chiu et al., entitled UTILIZING SEMANTIC VISUAL LANDMARKS FOR MORE PRECISE VEHICLE NAVIGATION," and filed on Oct. 17, 2017. The entire content of Application No. 62/573,636 is incorporated herein by reference.

TECHNICAL FIELD

This disclosure generally relates to mobile platforms, and in particular, navigation for mobile platforms.

BACKGROUND

A vision-based navigation system for a mobile platform equipped with cameras or other image sensors may navigate for the mobile platform using a pre-built map of visual landmarks. For example, driver assistance systems or autonomous driving systems for vehicles may require sub-meter or centimeter level accuracy for situations such as obstacle avoidance or predictive emergency braking. Such a system can use the pre-built map, in which a map of an environment in which the system will be operating is constructed and georeferenced beforehand, for global positioning of the system during navigation by matching feature observations from on-board image sensors to the pre-built map. Due to the low cost and small size of image sensors, this approach improves over traditional solutions that use costly and bulky sensors such as differential GPS or laser scanners.

SUMMARY

In general, the disclosure describes techniques for improving navigation accuracy by a navigation system for a mobile platform by separating salient semantically segmented visual features from less-important visual features, and using only the visual features that are salient over time as constraints to generate navigation information. In one example, an image sensor of a navigation system generates a plurality of images of an environment of the navigation system. Each image depicts one or more features in the environment. The navigation system processes each image of the plurality of images to determine respective semantic classes of the one or more features depicted by the image. For each of the features, the navigation system uses the semantic class of the to determine whether to include the feature as a constraint in a navigation inference engine. The navigation system generates navigation information using the feature constraints of the navigation inference engine as constraints on estimates of a position and/or orientation of the navigation system within the environment. The navigation system may output the navigation information to improve navigation accuracy for the mobile platform.

In some examples, a navigation system comprises: an image sensor configured to generate a plurality of images, each image of the plurality of images comprising one or more features; and a computation engine executing on one or more processors and configured to process each image of the plurality of images to determine a semantic class of each feature of the one or more features of the image; wherein the computation engine is further configured to determine, for each feature of the one or more features of each image and based at least on the semantic class of the feature, whether to include the feature as a constraint in a navigation inference engine, wherein the computation engine is further configured to generate, based at least on features of the one or more features included as constraints in the navigation inference engine, navigation information, and wherein the computation engine is further configured to output the navigation information to improve navigation accuracy for a mobile platform.

In some examples, a method comprises: generating, by an image sensor of a navigation system, a plurality of images, each image of the plurality of images comprising one or more features; processing, by a computation engine of the navigation system and executing on one or more processors, each image of the plurality of images to determine a semantic class of each feature of the one or more features of the image; determining, by the computation engine and for each feature of the one or more features of each image and based at least on the semantic class of the feature, whether to include the feature as a constraint in a navigation inference engine; generating, by the computation engine and based at least on features of the one or more features included as constraints in the navigation inference engine, navigation information; and outputting, by the computation engine, the navigation information to improve navigation accuracy for a mobile platform.

In some examples, a non-transitory, computer-readable medium comprises instructions that, when executed, cause one or more processors of a computation engine of a navigation system to: receive, from an image sensor of the navigation system, a plurality of images, each image of the plurality of images comprising one or more features; process each image of the plurality of images to determine a semantic class of each feature of the one or more features of the image; determine, for each feature of the one or more features of each image and based at least on the semantic class of the feature, whether to include the feature as a constraint in a navigation inference engine; generate, based at least on features of the one or more features included as constraints in the navigation inference engine, navigation information; and output the navigation information to improve navigation accuracy for a mobile platform.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
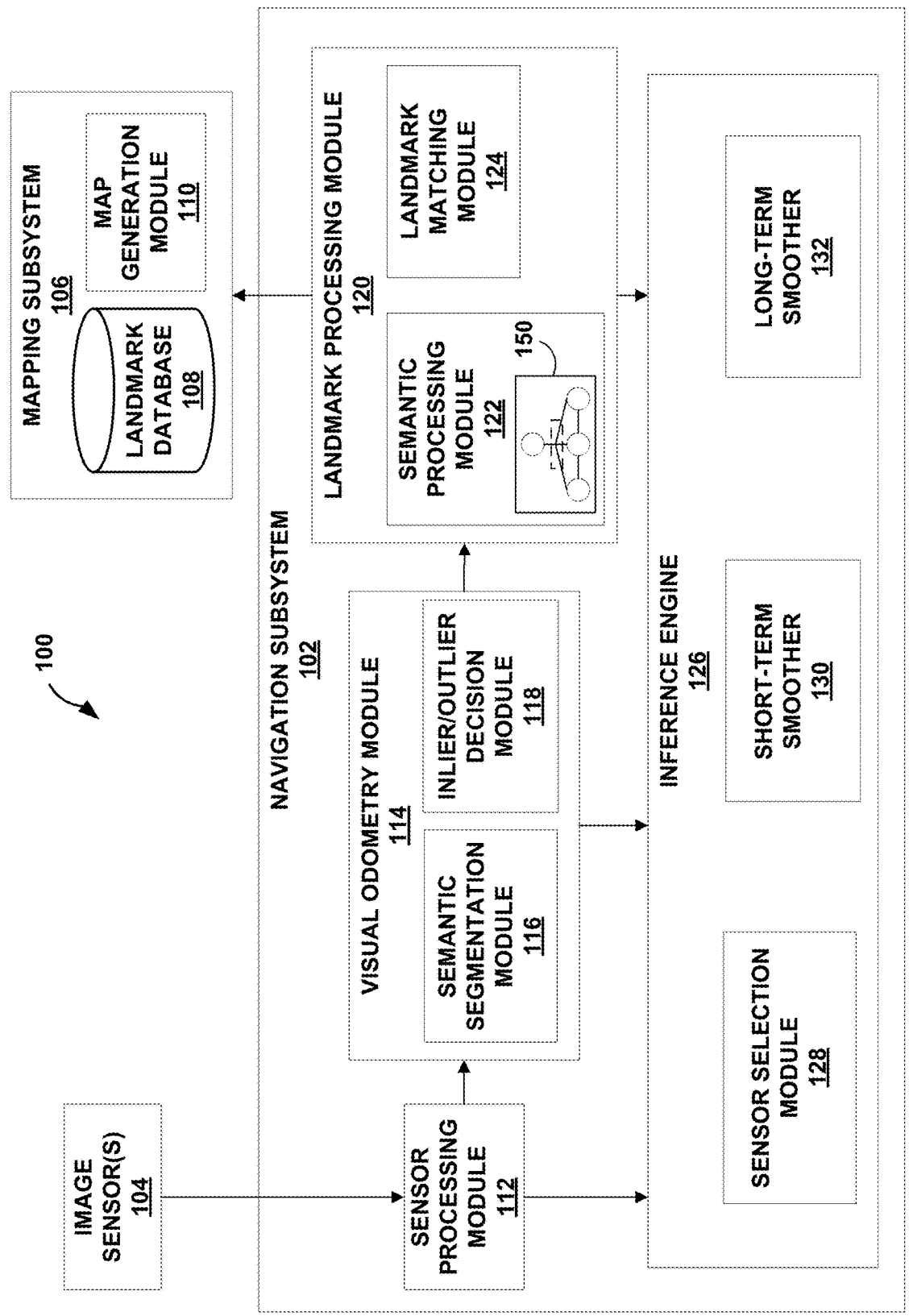
FIG. 1 is a block diagram of an example system for generating navigation information in accordance with the techniques of the disclosure.

In general, the techniques of the disclosure use semantic information associated with visual features, including visual landmarks, to make decisions in an overall navigation system. In particular, the navigation system may use the semantic information in inlier/outlier computations. As used herein, the terms "feature" and "landmark" may be used interchangeably. The techniques may be applied by a navigation system for a mobile platform, such as a mobile device, smartphone, laptop, virtual reality display, an augmented reality display, a human-piloted vehicle, a human-machine interface, or an autonomous vehicle, such as a robot, aerial vehicle, drone, guided weapon, or other device or system that generates navigation information or operates at least partially autonomously.

In one example, features that belong to inlier semantic classes may be included as constraints in a navigation inference engine for computing navigation information for the navigation system, while features that belong to outlier semantic classes may be discarded. In one example, the navigation inference engine stores feature constraints as factors in a factor graph. The disclosure may refer to the process of differentiating features that belong to inlier semantic classes from features that belong to outlier semantic classes as "gating." The resulting factor graph of inlier feature information may be referred to as a "gated" factor graph. In other examples, the navigation inference engine stores feature constraints as constraints in, e.g., an extended Kalman Filter, a fixed-lag smoother, a Bayesian graphical model, or another data structure capable of storing feature information as constraints. The constraints of the navigation inference engine may then be used in various applications such as in feature tracking, map building, and vehicle navigation. In one technique, the semantic information is derived utilizing a pre-trained deep learning network, trained for semantic segmentation. Subsequent to derivation of the semantic information, a computation engine is utilized to make an inlier/outlier decision for each of the objects depending on the associated semantic information. The techniques of the disclosure allow for improved precision in navigation applications.

In general, a factor graph is a probabilistic Bayesian graphical model involving state variables and factor nodes. Factor graphs naturally encode the factored nature of the probability density over the states, clearly separating the state representation from the constraints induced by the measurements. The connectivity of the factor graph defines which state variables are affected by which sensor measurements. This explicit representation makes factor graphs a useful tool for a sensing and navigation framework.

Using visual information from permanent structures rather than temporal objects may improve the mapping quality and navigation accuracy for vision-based navigation systems. With new advances in deep learning, previously difficult computer vision problems such as object recognition and scene classification may be solved with high accuracy. The availability of these trained models may reduce the difficulty in implementing these vison-based navigation techniques. For example, off-the-shelf video segmentation tools may classify object categories from a street scene with high accuracy and can help the navigation problem.

Conventional navigation systems for mobile platforms may achieve high-level accuracy for navigation by fusing high precision differential GPS with high-end inertial measurement units (IMUs). However, this is prohibitively expensive for commercial purpose. Alternatively, nondifferential GPS systems may be cheaper, but rarely reach satisfactory accuracy due to signal obstructions or multipath effects.

In some examples, Simultaneous Localization and Mapping (SLAM) may add semantic information to the mapping process. The use of semantic information in mapping may aid SLAM navigation problems. However, maps maintained in conventional systems may only preserve high-level objects/planes or other semantic entities. Such conventional systems are typically used in the domain of mobile robots that operate indoors. These conventional systems may maintain representations of objects or locations of obstacles (such as walls) that the robot can maneuver, but are not applicable to the autonomous navigation problem. For example, such conventional systems may be unable to maintain both high-level semantic information and low-level visual features associated with landmarks mapped in the environment. In addition, these works use complex algorithms to perform image/video segmentation to derive semantic information for the localization and mapping process.

The techniques of the disclosure include using semantic information associated with each imaged feature to decide whether to use this feature in a navigation system for a mobile platform. Selecting a feature based on semantic information can be performed for the feature tracking process in a real-time navigation system as well as, or alternatively to, the map building process performed prior to navigation. Further, the techniques may improve navigation performance, both with and without the use of pre-mapped visual landmarks. The techniques of the disclosure may use deep learning to perform segmentation tasks in a manner that may reduce the complexity of mobile platform navigation. Further, by reducing the complexity, such techniques may operate in real-time, consume less power, and consume less computational resources over conventional techniques. The techniques of the disclosure may ensure high overall global navigation accuracy in GPS-denied navigation environments, as well as in locations where few or no valid visual landmarks are available due to scene occlusion or appearance change.

FIG. 1 is a block diagram of an example system for generating navigation information in accordance with the techniques of the disclosure. In accordance with the techniques of the disclosure, system 100 may improve navigation accuracy for a mobile platform by using features included as constraints within navigation inference engine 126 to generate navigation information. In the example of FIG. 1, navigation subsystem 102 uses gated factor graph 150 of visual features to store the features used as constraints in generating the navigation information, as will be described in more detail below. However, in other examples, navigation subsystem 102 store the features as constraints in, e.g., an extended Kalman Filter, a fixed-lag smoother, a Bayesian graphical model, or another data structure capable of storing feature information as constraints. System 100 may use the techniques of the disclosure to efficiently fuse pre-mapped visual landmarks as individual point measurements to achieve sub-meter overall global navigation accuracy in large-scale urban environments. In some examples, system 100 constructs a visual map beforehand by using sensors 104. Using the techniques described herein, system 100 may improve both the mapping quality and the tracking process over conventional systems. Further, system 100 may achieve an approximately 20% improvement in accuracy for GPS-denied navigation solutions.

Figure 2:
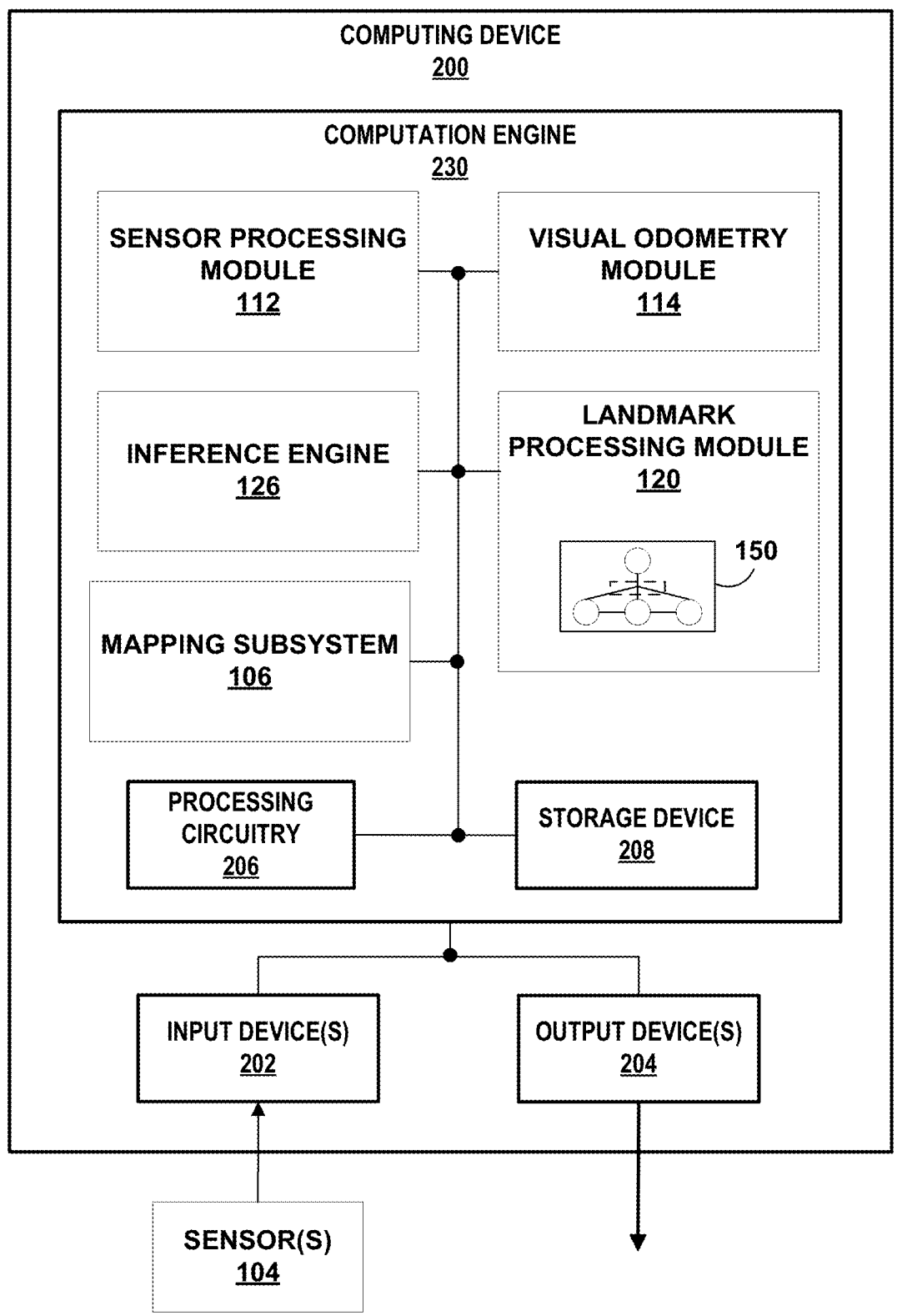
FIG. 2 is a block diagram illustrating a computation engine configured to generate navigation information in accordance with the techniques of the disclosure.

System 100 may be deployed in various host mobile platforms such as cars, drones, or mobile devices carried by pedestrians. System 100 may be implemented within a computing system or platform, such as illustrated in FIG. 2. In addition, system 100 may communicate to other systems, displays, or mechanisms depending on the host mobile platform. As one example, if the host mobile platform is a car or other vehicle, then system 100 may communicate to a steering mechanism of the car.

In one example, image sensors 104 generate a plurality of images of an environment of system 100. Each image depicts one or more features in the environment. Navigation subsystem 102 processes each image of the plurality of images to determine a semantic class of the features depicted by the image. Navigation subsystem 102 uses the semantic class of each feature of each image to determine whether to include the feature as a factor in factor graph 150 or discard the feature. The disclosure may refer to this process as "gating," and resulting factor graph 150 may be referred to as a "gated" factor graph. Navigation subsystem 102 generates navigation information using the factors of gated factor graph 150 as constraints on estimates of a position and/or orientation of system 100 within the environment. Navigation subsystem 102 may output the navigation information to improve navigation accuracy for a mobile platform. Examples of mobile platforms may include a mobile device, smartphone, laptop, virtual reality display, an augmented reality display, a human-piloted vehicle, a human-machine interface, or an autonomous vehicle, such as a robot, aerial vehicle, drone, guided weapon, or other device or system that generates navigation information or operates at least partially autonomously.

Sensors 104 may be, for example, one or more image capture devices that produce a plurality of two-dimensional (2D) frames at a local pose of the image capture devices, which may correspond to a local pose of system 100 to which the image capture devices are attached. In some examples, sensors 104 may be another type of image capture device that generates, for a scene, 2D or 3D images, for example, a video camera, a laser scanner or other optical device that produces a stream of image data, a depth sensor that produces image data indicative of ranges for features within the environment, a stereo vision system having multiple cameras to produce 3D information, a Doppler radar, sonar, LIDAR, or other image capture device. In some examples, sensors 104 include a ground monocular or stereo video camera. The images produced by sensors 104 may represent two-dimensional images generated periodically, on-demand, as frames of a video stream, and so forth. 2D frames may be of various resolutions and generated in various formats that may be processed by navigation system 102.

In some examples, sensors 102 include an IMU that produces IMU data indicative of a dynamic motion of system 100. Such an IMU may, for example, detect a current rate of acceleration using one or more accelerometers as system 100 is translated, and detect changes in rotational attributes like pitch, roll and yaw using one or more gyroscopes. The IMU produces IMU data to specify the detected motion. In this way, the IMU provides proprioceptive information the movement and orientation of system 100 within the environment.

In some examples, sensors 102 include a GPS unit that produces GPS data for system 100. The GPS unit is a device capable of receiving information from one or more GPS satellites. Based on the received information, the GPS unit may calculate a geographical position of system 100. In some examples the GPS unit may calculate a latitudinal and longitudinal position of system 100. In some examples, the GPS unit is a non-differential GPS device. In some examples, the GPS unit reports a 3D position of system 100 as system 100 moves through the world coordinate system. In some examples, sensors 104 are only camera sensors, while in other examples, sensors 104 may include various camera, video, IMU, and GPS sensors.

Navigation subsystem 102 includes sensor processing module 112, visual odometry module 114, landmark processing module 120, and inference engine 126. Sensor processing module 112 may perform additional processing of information received from sensors 104. Data from sensors such as IMU and GPS may require little or no pre-processing and may be sent directly to downstream modules. Data from cameras may need processing before being sent out to downstream modules. In particular, data from cameras may be routed to visual odometry module 114.

In the example of FIG. 1, visual odometry module 114 processes input video frames, tracks features across sequential video frames and provides that information to landmark matching module 124 and inference engine 126. That is, visual odometry module 114 may use IMU readings propagated from a previous pose and relative motion information determined using features tracked from a previous frame to a current frame, and provide this information to inference engine 126 to estimate a pose for system 100. In some examples, visual odometry module 114 uses GPS information, pre-built geo-referenced maps, or other information to detect and match features across consecutive frames.

In some examples, visual odometry module 114 uses semantic processing to improve the accuracy of pose calculations. For example, semantic segmentation module 116 of visual odometry module 114 applies sematic segmentation to incoming video frames. In semantic segmentation, and in particular, in video based semantic segmentation, semantic segmentation module 116 segments input video frames into various classes and semantic labels are associated with each class. As an example, semantic segmentation module 116 may analyze an input video frame containing two trees. Although each tree may be individually separated or segmented, semantic segmentation module 116 assigns, to pixels in the input video frame of both trees, the "tree" semantic class. In some examples, various tools may perform semantic segmentation. One example of a tool for semantically segmenting images is the SegNet encoder decoder network. The original SegNet architecture is an encoder-decoder network, which comprises of 4 layers for both encoder and decoder. The SegNet architecture is used to generate per-pixel labels for input sequences. The SegNet architecture may allow for the use of off-the-shelf, trained models for urban segmentation tasks and a high ease of use. However, the techniques disclosed herein may be used with any method or system that can generate dense segmentation labels on video frames. In one example of the techniques of the disclosure, 12 different semantic class labels are used: Sky, Building, Pole, Road Marking, Road, Pavement, Tree, Sign Symbol, Fence, Vehicle, Pedestrian, and Bike. In other implementations, more, fewer, or other semantic class labels may be used.

In one embodiment, semantic segmentation module 116 performs semantic processing of images at speeds suitable for real-time navigation. In some examples, semantic segmentation module 116 uses multiple processors operating in parallel to perform semantic segmentation in real-time. In other examples, other segmentation tools may be used, such as a modified SegNet model. In one method, a lower-rank version of the SegNet architecture is used to reduce computation time while maintaining accuracy by removing redundant convolutional kernels. The modified, lower-rank version of the SegNet architecture may approximate the original SegNet architecture by converting all layers with only 25% convolutional kernels. Additional explanation of semantic segmentation may be found, e.g., in U.S. application Ser. No. 16/101,201 to Chiu, et al, entitled "AUGMENTING REALITY USING SEMANTIC SEGMENTATION" and filed on Aug. 10, 2018 and in International Application No. PCT/US2017/024554 to Chiu, et al, entitled "COLLABORATIVE NAVIGATION AND MAPPING" and filed on Mar. 28, 2017, the entire content of each of which is incorporated herein by reference.

For multiple observations of the same landmark, inlier/outlier decision module 118 determines what semantic class may be associated with a specific landmark or feature. In some examples, inlier/outlier decision module 118 determines a statistical mode of a semantic class of multiple observations of a feature across multiple video frames to determine an actual semantic class of the observed feature. Inlier/outlier decision module 118 determines whether to allow a particular landmark to be considered for pose evaluation. The process of inlier/outlier decisions may be accomplished by allowing salient semantic classes of features and rejecting less-important semantic classes of features. For example, less-important semantic classes of features may include non-static objects or far-away features. Non-static features may include pedestrians, vehicles, bikes, roads, and other objects. Far-way features may include the sky. For example, imaged features of parked vehicles can be considered to be temporal because they may move or disappear between subsequent frames. Further, the road often does not add much visual information because most of the extracted features from the road are typically associated with shadows, which change over time. Therefore, such non-static features are not reliable and can inject error into the navigation information of system 100 and should not be maintained in the map during a subsequent map building process. In contrast, classes of features that are salient over time, such as static features such as poles, road markings, pavements, sign symbols, trees, buildings, and fences, may be reliable constraints for the map building process and should be included.

In some examples, inlier/outlier decision module 118 determines a Boolean variable c for each feature depicted in each image received from sensors 104. Inlier/outlier decision module 118 determines whether to allow a particular landmark to be considered for pose evaluation by setting the value of c. In some examples, if the Boolean variable c is true for a particular feature, the feature is added to factor graph 150 of feature information for use in generating navigation information for system 100. In one example, inlier/outlier decision module 118 determines the value of the Boolean variable c for a particular sematic class based on a priori information. On the other hand, if c is false for a particular feature, then that feature is gated (e.g., excluded) from factor graph 150 of feature information and therefore is not used to generate the navigation information for system 100. In this fashion, inlier/outlier decision module 118 may create gated factor graph 150 of feature information, the use of which may improve the accuracy of navigation of system 100 over conventional systems. Further, only features and landmarks that have been allowed by inlier/outlier decision module 118 are sent by visual odometry module 114 to landmark matching module 124 for inclusion in gated factor graph 150 of features for use in computing pose information for system 100. In some examples, gated factor graph 150 is implemented within semantic processing module 122.

In the example of FIG. 1, navigation subsystem 102 stores the feature constraints as factors in factor graph 150. However, the techniques of the disclosure may be implemented in other types of navigation systems that use other types of data structures to store inlier feature information as constraints on the generation of navigation information. For example, navigation subsystem 102 may store the feature constraints as constraints in, e.g., an extended Kalman Filter, a fixed-lag smoother, a Bayesian graphical model, or another data structure capable of storing feature information as constraints.

Landmark processing module 120 extracts information from the tracked features as a step in the generation of geo-referenced maps. For example, semantic processing module 122 receives information about the tracked landmarks from landmark matching module 124 and generates semantically segmented information for associated landmarks. Landmark processing module 120 provides information to inference engine 126 and to mapping subsystem 106. For example, landmark matching module 124 constructs a keyframe database, e.g., landmark database 108, and matches features across images to features existing in landmark database 108. If a match is found, the coordinates of the landmark that was previously calculated is provided to inference engine 126. Inference engine 126 calculates the current pose for the current time based on this and other information such as the IMU information.

Mapping subsystem 106 includes map generation module 110 and landmark database 108. Landmark database 108 is a database of maps generated by combining various information the information from landmark processing module 120.

Inference engine 126 may tightly couple visual and inertial information to efficiently use pre-mapped visual landmarks to achieve sub-meter overall global accuracy in large-scale urban environments, using only IMU and a monocular camera. Further, inference engine 126 may build a high-quality, fully-optimized map of visual landmarks using IMU data, GPS data, and visual information received from sensor processing module 112, visual odometry module 114, and landmark processing module 120. In some examples, inference engine 126 may incorporate semantic information in both the map building process and GPS-denied navigation using pre-mapped visual landmarks. Based on the received data, inference engine 126 computes a current pose of system 100. Once landmark database 108 is calculated as explained previously, inference engine 126 may use the landmarks and their associated 2D-3D coordinates to calculate the current pose of system 100. For example, inference engine 126 receives sensor data from sensors 104 and uses positions of the landmarks matched by landmark matching module 124 to determine navigation data for system 100. Landmark matching module 124 matches current information with the information in landmark database 108. Once the match is confirmed, the 2D-3D coordinates of the matched feature are provided to inference engine 126. Inference engine 126 may use this information to calculate the current pose of system 100, generate a map of the environment in which system 100 is located, or generate navigation information for traversing the environment.

The techniques of the disclosure may improve navigation precision by navigation systems. For example, the techniques of the disclosure may allow for the implementation of navigation systems that are more precise over conventional systems. The techniques of the disclosure may allow for a high level of accuracy required to enable deployment of technologies such as autonomous cars or other vehicles. Furthermore, using the techniques disclosed herein, navigation technologies may provide high navigational precision even in regions where the GPS signal is poor or non-existent.

FIG. 2 is a block diagram illustrating an example computing device 200 configured to generate navigation information in accordance with the techniques of the disclosure. In the example of FIG. 2, computing device 200 includes computation engine 230, one or more input devices 202, and one or more output devices 204.

In the example of FIG. 2, computing device 200 may provide sensor input to computation engine 230 via one or more input devices 202. In some examples, the sensor input includes 3D mapping information from 3D mapping reference database 112, a 2D image frame from camera 101 that depicts scene at a local pose of a mobile platform for computing device 200, IMU data from IMU 130, and/or GPS data from GPS 132. Input devices 202 may include hardware and/or software for establishing a connection with computation engine 230. For example, input devices 202 may communicate with computation engine 230 via a direct, wired connection, over a network, such as the Internet, or any public or private communications network, for instance, broadband, cellular, Wi-Fi, and/or other types of communication networks, capable of transmitting data between computing systems, servers, and computing devices. Input devices 202 may be configured to transmit and receive data, control signals, commands, and/or other information across such a connection using any suitable communication techniques to receive the sensor data. For example, input devices 202 and computation engine 230 may each be operatively coupled to the same network using one or more network links. The links coupling input devices 202 and computation engine 230 may be wireless wide area network link, wireless local area network link, Ethernet, Asynchronous Transfer Mode (ATM), or other types of network connections, and such connections may be wireless and/or wired connections.

Computation engine 230 includes sensor processing module 112, visual odometry module 114, landmark processing module 120, mapping subsystem 106, and inference engine 126. Each of components 106, 112, 114, 120, and 126 may operate in a substantially similar fashion to the like components of FIG. 1. Computation engine 230 may represent software executable by processing circuitry 206 and stored on storage device 208, or a combination of hardware and software. Such processing circuitry 206 may include any one or more of a microprocessor, a controller, a digital signal processor (DSP), an application specific integrated circuit (ASIC), a field-programmable gate array (FPGA), or equivalent discrete or integrated logic circuitry. Storage device 208 may include memory, such as random-access memory (RAM), read only memory (ROM), programmable read only memory (PROM), erasable read only memory (EPROM), electronically erasable programmable read only memory (EEPROM), flash memory, comprising executable instructions for causing the one or more processors to perform the actions attributed to them.

Computing device 200 or aspects thereof, such as computation engine 230 or select units thereof, may be located remote from a mobile platform for which a local pose is being estimated. For example, a mobile platform may include an attached camera 104 and upload 2D images via a wireless communication link to a cloud-based or other remote computing device 200 that generates navigation information using the techniques described above. A communication device of the mobile platform may receive, via the wireless communication link, the navigation information generated by computing device 200 to improve the accuracy of navigation of the mobile platform.

In some examples, semantic georegistration unit 104 of computation engine 230 processes received image data to generate semantically segmented sub-views of the received image data. For example, semantic georegistration unit 104 processes the 2D image frame from camera 101 that depicts the local pose of the mobile platform to generate semantically segmented sub-views of the 2D image frame at the local pose. Further, semantic georegistration unit 104 processes the 3D mapping information from 3D mapping reference database 112 to obtain an estimated view of the 3D mapping information at the estimated pose prior. Further, scene understanding unit 114 correlates the semantically segmented sub-views of the estimated view to the semantically segmented sub-views of the two-dimensional frame at the local pose to generate an estimate of the local pose of the mobile platform.

Output device 204 may include a display, sound card, video graphics adapter card, speaker, presence-sensitive screen, one or more USB interfaces, video and/or audio output interfaces, or any other type of device capable of generating tactile, audio, video, or other output. Output device 204 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In other examples, output device 204 may produce an output to a user in another fashion, such as via a sound card, video graphics adapter card, speaker, presence-sensitive screen, one or more USB interfaces, video and/or audio output interfaces, or any other type of device capable of generating tactile, audio, video, or other output. In some examples, output device 204 may include a presence-sensitive display that may serve as a user interface device that operates both as one or more input devices and one or more output devices.

Accordingly, the techniques of the disclosure allow for improved precision in navigation applications. For example, the techniques of the disclosure may allow for the implementation of navigation systems that are more precise over conventional systems. Further, the techniques of the disclosure may allow for a high level of accuracy required to enable deployment of technologies such as autonomous cars. Furthermore, using the techniques disclosed herein, navigation technologies may provide high navigational precision even in regions where the GPS signal is poor or non-existent.

Figure 3:
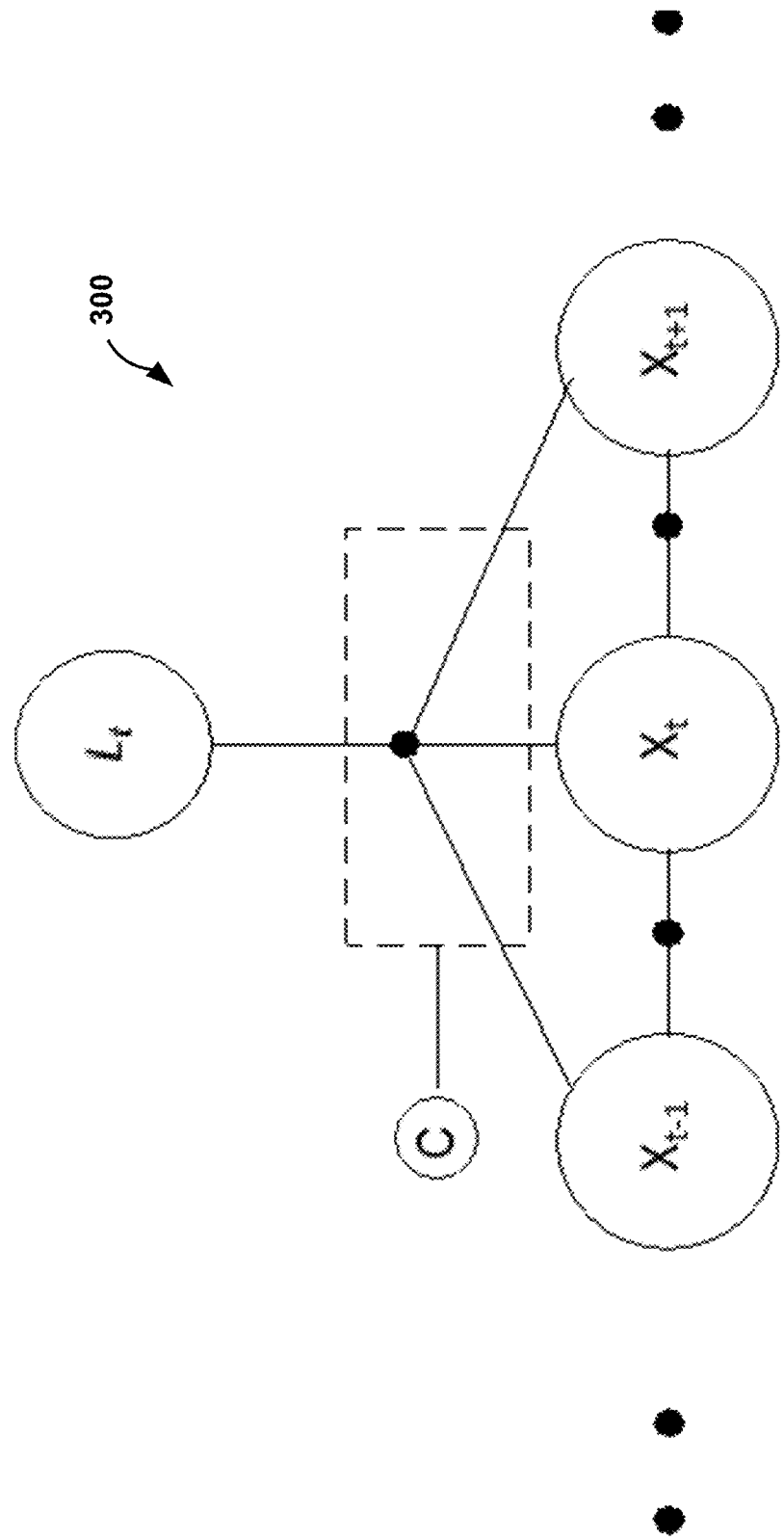
FIG. 3 is a block diagram illustrating a gated factor graph of features in accordance with the techniques of the disclosure.

FIG. 3 is a block diagram illustrating gated factor graph 300 of features in accordance with the techniques of the disclosure. In some examples, gated factor graph 300 is an implementation of gated factor graph 150 of FIG. 1. In some examples, gated factor graph 300 is used to make inlier/outlier decisions on semantic information of features. This technique is referred to as the "gated factor graph" technique herein.

Factor graphs are graphical models that are well suited to modeling complex estimation problems, such as SLAM. A factor graph is a bipartite graph model comprising two node types: factors $f \in \Im$ and state variables $\theta_j \in \Theta$. For the purposes of vision-based systems being described in this application, two types of state variable modes are utilized as shown in FIG. 3.

The navigation state nodes X includes the platform information (such as pose and velocity) at all given time steps, while the landmark states L encodes the estimated 3D position of external visual landmarks. Sensor measurements $z_k \in Z$ are formulated into factor representations, depending on how a measurement affects the appropriate state variables. For example, a GPS position measurement only involves a navigation state X at a single time. A camera feature observation can involve both a navigation state X and a state of unknown 3D landmark position L.

The inference process of such a factor graph can be viewed as minimizing the non-linear cost function as follows:

$$\Sigma_{k=1}^{K} \|h_k(\Theta_{jk}) - z_k\|_{\Sigma}^2$$

Where $h(\Theta_{jk})$ is the measurement function and $\|.\|_{\Theta}^2$ is the Mahalanobis distance with covariance $\Sigma$. There are many efficient solutions to solve this inference process for SLAM systems using the factor graph representation. In one technique, a Bayes tree data structure is used to keep all past information and only update variables influenced by each new measurement.

The gated factor graph approach developed for this application extends the factor graph representation by modeling the semantic constraint as a gated factor (the dashed lines in FIG. 3) in factor graph 300 for the inference process. As shown in FIG. 3, a landmark state $L_t$ is only added to the graph to participate the inference process if the condition variable c is true. Otherwise this landmark is not used during the inference process.

The value of the condition variable c is utilized for the inlier and outlier decisions. The semantic segmentation step described earlier produces semantic class labels for each pixel of an input image. However, the same landmark may be associated with different class labels in different video frames as the conditions of observations may have changed. To address this issue, the class labels for all imaged features corresponding to the same landmark are accumulated and the Boolean value of c is decided based on the final counts among the classes. In some examples, the value on the condition variable c associated with a landmark state is assigned based on the modes of semantic class labels from all observations (2D visual features) on camera images for the same 3D visual landmark. Thus, if the semantic segmentation tool results in a classification of a pixel into one of 12 classes, and if a particular feature associated with a landmark was classified as a specific class more than (as an example) 75% of number of times it was observed, then the Boolean value may be assigned a "true" value. This decision would then result in the particular feature being included as an "inlier". Other decision criteria may be used to make this decision such as without limitation over 50% or over 90%. The information of which classes to include may be stored in storage device 208 of FIG. 2. Thus as described above, sematic processing along with a technique to use the output of sematic classification provides a technique to make decisions regarding whether to include or exclude certain objects for navigation and/or mapping.

As described above, semantic processing may be utilized to make inlier/outlier decisions by rejecting certain classes of objects such as without limitation, non-static objects or far-away objects. The semantic segmentation process may be implemented by semantic segmentation module 116 of FIG. 1. Gated factor graph 300 and inlier/outlier decisions may be implemented by inlier/outlier decision module 118 of FIG. 1. With this implementation, enhanced feature tracking may be provided within SLAM systems even if GPS or prebuilt geo-referenced maps are not available.

For each of the tracked features identified on a current video frame within visual odometry module 114, gated factor graph 300 makes inlier/outlier decisions based on the modes of semantic class labels from all 2D imaged positions tracked on past frames of the same tracked feature. Visual features identified as non-static (such as Pedestrian, Vehicle, Bike) or far-away classes (such as Sky) are rejected, and are not allowed to contribute to the navigation solution (e.g., these features are gated from inclusion within gated factor graph 300). Thus, only the allowed features are supplied downstream to inference engine 126 for computation of the navigation solution. Thus, by disallowing non-static or far-away classes, the accuracy of the navigation solution is improved. In other configurations, other classes may be allowed or disallowed.

The semantic processing described earlier may be utilized for improving the mapping quality during the geo-referenced map building process and during the localization process. In this case in one configuration, the semantic processing may be performed by semantic processing module 122 implemented within landmark processing module 120.

Figure 4:
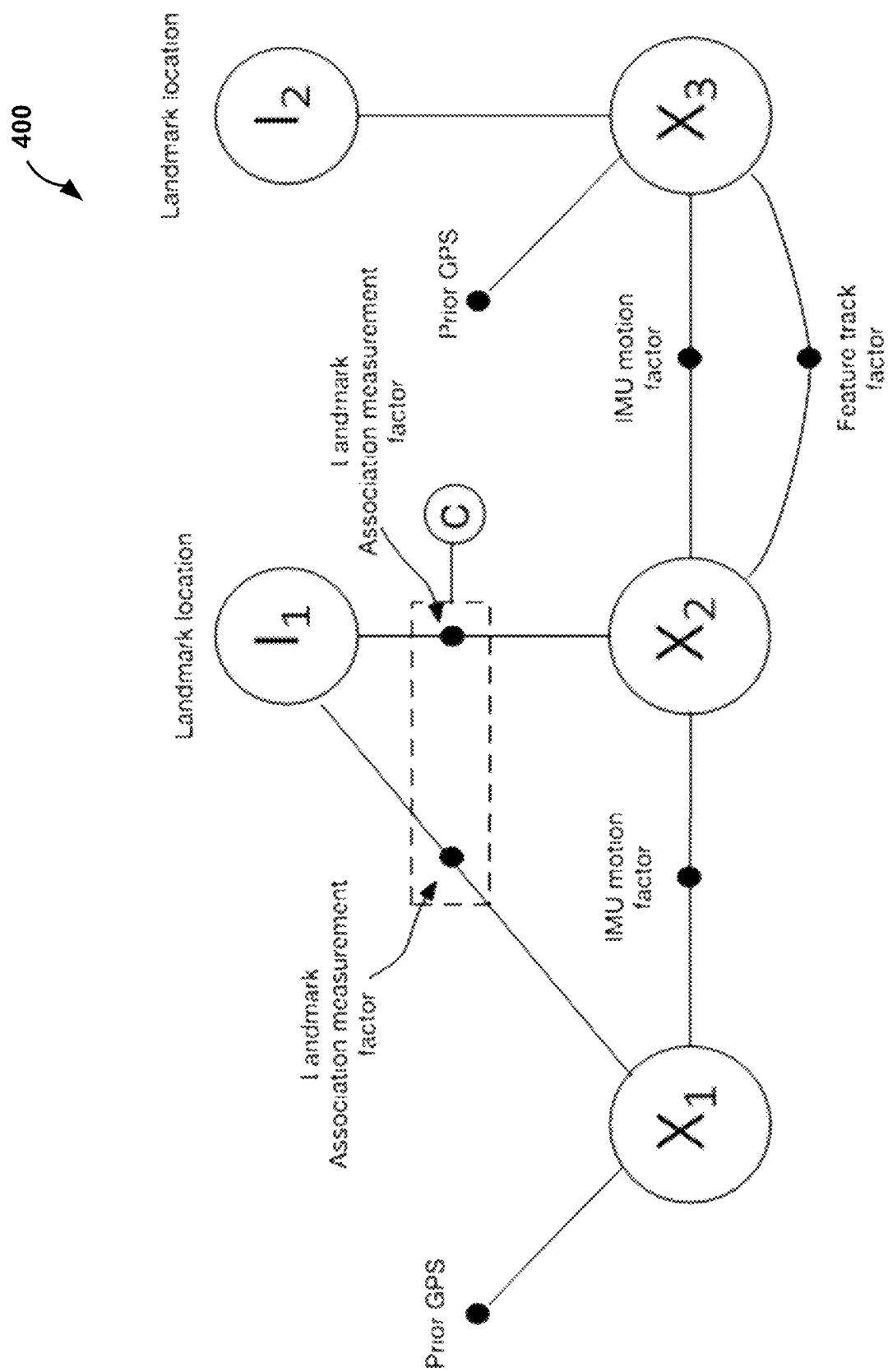
FIG. 4 is a block diagram illustrating a gated factor graph of features in accordance with the techniques of the disclosure.

FIG. 4 is a block diagram illustrating gated factor graph 400 of features in accordance with the techniques of the disclosure. In some examples, gated factor graph 400 is an implementation of gated factor graph 150 of FIG. 1. In some examples, gated factor graph 400 may be used for geo-referenced map building. Gated factor graph 400 may be implemented within landmark processing module 120 of FIG. 1.

FIG. 4 illustrates a section of a gated factor graph, such as gated factor graph 150, for the map building process. Here factors are formed using the measurements from GPS, IMU and feature tracks (from the visual odometry module). X1, X2 and X3 represent the navigation states and the L1 and L2 represent the landmark states. The GPS measurements are also indicated in this graph. The dotted lines represent the gated approach where c is the condition variable. This graph indicates that only when c is true the specific landmark and the measurements associated (such as the GPS location) with it are included in the landmark database.

The Boolean variable c may be calculated using multiple techniques. In one technique, c is assigned a true value if a landmark is among a predetermined list. The predetermined list may be stored in storage device 208 of FIG. 2. As an example, all objects within the semantic classes of a Pole, Pavement, Tree may be included within factor graph 400. On other hand, the semantic class of Road may not be included within factor graph 400. Thus with the techniques of the disclosure, only certain class labels are allowed to be included in the generation of the map. Next, to determine the semantic class label of the landmark, in one technique the mode of all labels from all tracked 2D imaged features of the same 3D landmark, is calculated. Thus, once the semantic class label for a particular landmark is calculated, c determines if that landmark should be included in the map of not. With this method, non-stationary objects such as cars, far-away objects such as sky or other objects that do not provide valuable information such as the road, are not included in factor graph 400 and are not used for building the georeferenced map.

Figure 5:
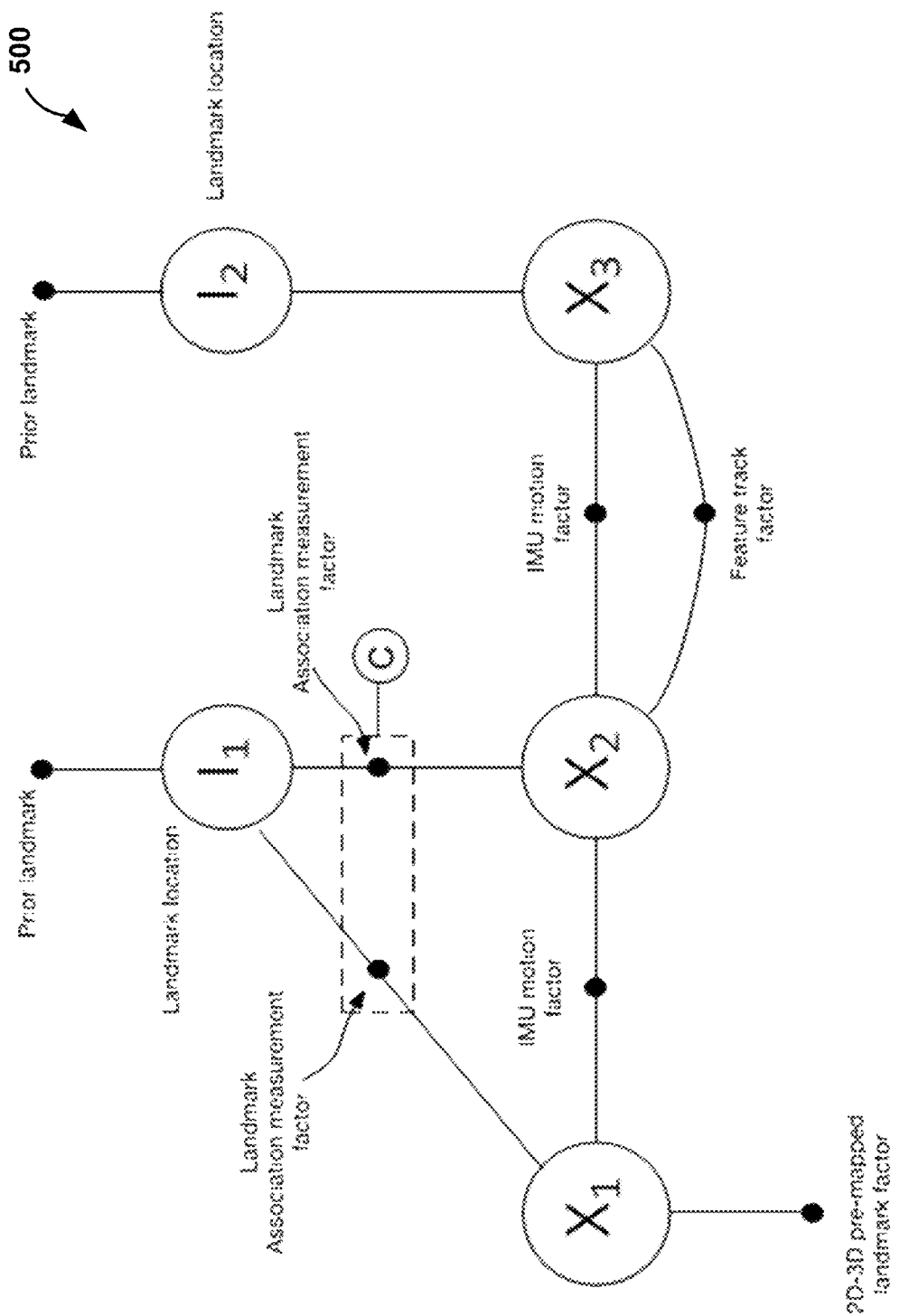
FIG. 5 is a block diagram illustrating a gated factor graph of features in accordance with the techniques of the disclosure.

FIG. 5 illustrates a section 500 of a gated factor graph for the calculation of current pose in GPS-denied environments. In some examples, section 500 may be a section of gated factor graph 150 of FIG. 1. In the example of FIG. 5, the factors, represented by black dots, are formed using measurements from sensors 104 of FIG. 1, such as IMU sensor data, feature tracks from visual odometry module 114, and pre-mapped visual landmark observations. The states of subject platform are denoted by X and the landmark locations are denoted by L. In the example of FIG. 5, the variable c determines which currently observed landmark is to be allowed to participate in the calculation of the navigation state X (e.g., included or "gated" in the factor graph). The variable c is determined by the semantic processing as described above. Accordingly, the techniques of the disclosure may generate a subset of observed, static landmarks that may be used to calculate a pose of system 100 while excluding objects such as moving cars or far-away objects from the calculation of the pose.

Figure 6:
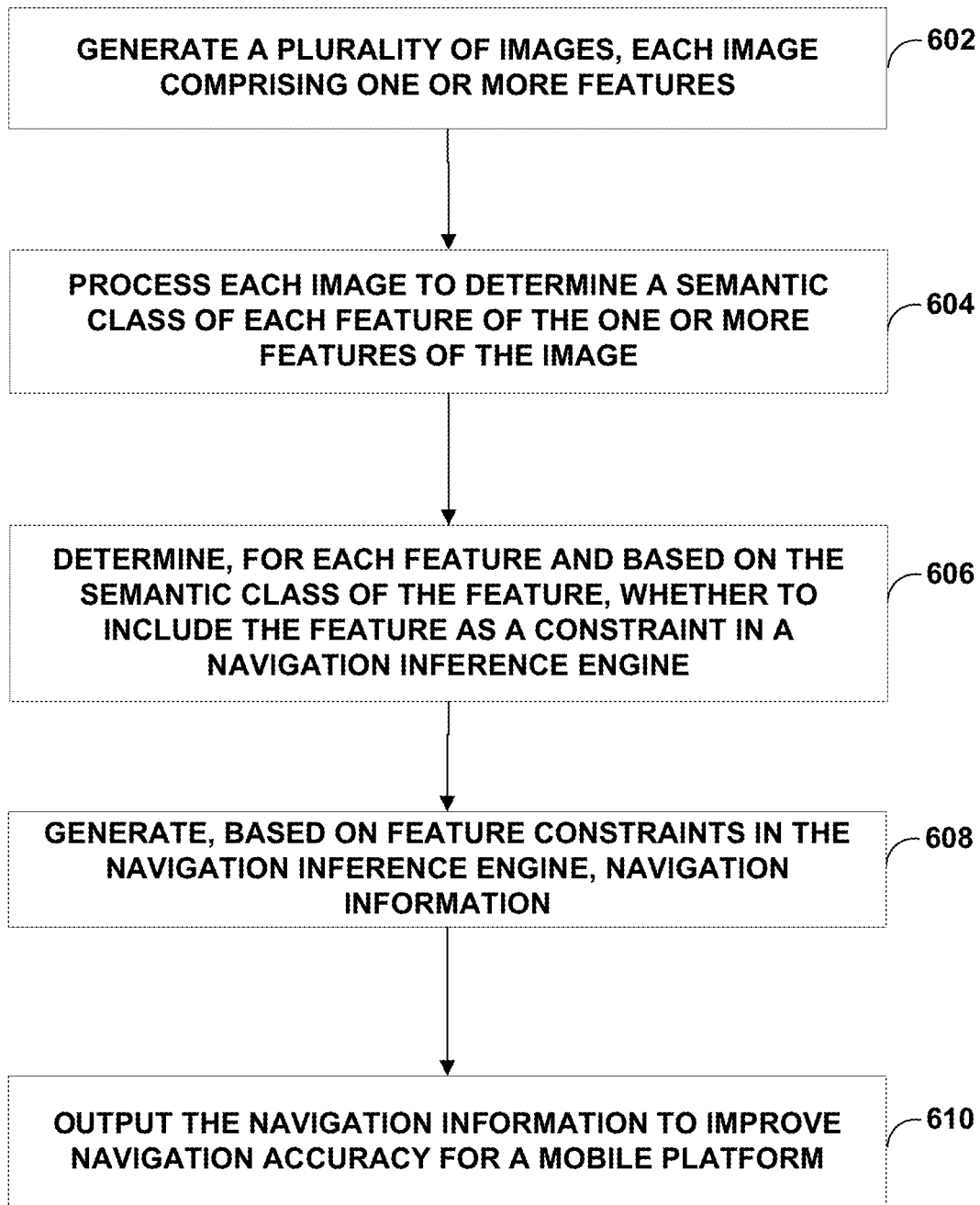
FIG. 6 is a flowchart illustrating an example operation in accordance with the techniques of the disclosure.

FIG. 6 is a flowchart illustrating an example operation in accordance with the techniques of the disclosure. For convenience, FIG. 6 is described with respect to FIG. 1. However, in other examples the operation of FIG. 6 may be performed by other implementations of the techniques of the disclosure, such as by computing device 200 of FIG. 2.

In one example, image sensors 104 generate a plurality of images (602). Each image of the plurality of images includes one or more features in the environment. Sensor processing module 112 may perform additional processing of information received from sensors 104. Data from sensors such as IMU and GPS may require little or no pre-processing and may be sent directly to downstream modules. Data from cameras may need processing before being sent out to downstream modules. In particular, data from cameras may be routed to visual odometry module 114.

Semantic segmentation module 116 of visual odometry module 114 processes each image of the plurality of images to determine a semantic class of each feature of the one or more features of the image (604). For example, semantic segmentation module 116 segments input video frames into various classes and associates semantic labels with each class. In one example of the techniques of the disclosure, 12 different semantic class labels are used: Sky, Building, Pole, Road Marking, Road, Pavement, Tree, Sign Symbol, Fence, Vehicle, Pedestrian, and Bike. In other implementations, more, fewer, or other semantic class labels may be used. As an example, semantic segmentation module 116 may analyze an input video frame containing two trees. Although each tree may be individually separated or segmented, semantic segmentation module 116 assigns, to pixels in the input video frame of both trees, the "tree" semantic class.

Inlier/outlier decision module 118 of visual odometry module 114 determines, for each feature of the one or more features of each image and based on the semantic class of the feature, whether to include the feature as a constraint in inference engine 126 (606). In some examples, inlier/outlier decision module 118 determines whether to include the feature as a factor in factor graph 150 of feature information. In other examples, inlier/outlier decision module 118 determines whether to include the feature as a constraint in, e.g., an extended Kalman Filter, a fixed-lag smoother, a Bayesian graphical model, or another data structure capable of storing feature information as constraints. The process of inlier/outlier decisions may be accomplished by rejecting certain semantic classes of features, such as non-static objects or far-away features, and including other semantic classes of features, such as static features. Non-static features may include pedestrians, vehicles, bikes, roads, and other objects. Far-way features may include the sky. For example, imaged features of parked vehicles can be considered to be temporal because they may move or disappear between subsequent frames. Further, the road often does not add much visual information because most of the extracted features from the road are typically associated with shadows, which change over time. Therefore, such non-static features are not reliable and can inject error into the navigation information of system 100 and should not be maintained in the map during a subsequent map building process. In contrast, static features, such as poles, road markings, pavements, sign symbols, trees, buildings, and fences, may be reliable constraints for the map building process and should be included.

In some examples, inlier/outlier decision module 118 determines a Boolean variable c for each feature depicted in each image received from sensors 104. Inlier/outlier decision module 118 determines whether to allow a particular landmark to be considered for pose evaluation by setting the value of c. In some examples, if the Boolean variable c is true for a particular feature, the feature is added to factor graph 150 of feature information for use in generating navigation information for system 100. In one example, inlier/outlier decision module 118 determines the value of the Boolean variable c for a particular sematic class based on a priori information. On the other hand, if c is false for a particular feature, then that feature is gated (e.g., excluded) from factor graph 150 of feature information and therefore is not used to generate the navigation information for system 100. In this fashion, inlier/outlier decision module 118 may create gated factor graph 150 of feature information, the use of which may improve the accuracy of navigation of system 100 over conventional systems. Further, only features and landmarks that have been allowed by inlier/outlier decision module 118 are sent by visual odometry module 114 to landmark matching module 124 for inclusion in gated factor graph 150 of features for use in computing pose information for system 100.

Navigation subsystem 102 generates, based on feature constraints of inference engine 126 of feature information, navigation information (608). In one example, navigation subsystem 102 generates the navigation information based on factors of factor graph 150 of feature information. For example, landmark processing module 120 extracts information from the tracked features as a step in the generation of geo-referenced maps. Semantic processing module 122 receives information about the tracked landmarks from landmark matching module 124 and generates semantically segmented information for associated landmarks. Landmark processing module 120 provides information to inference engine 126 and to mapping subsystem 106.

Inference engine 126 builds a high-quality, fully-optimized map of visual landmarks using IMU data, GPS data, and visual information received from sensor processing module 112, visual odometry module 114, and landmark processing module 120. Inference engine 126 incorporates semantic information in both the map building process and GPS-denied navigation using pre-mapped visual landmarks included in gated factor graph 150. Based on the received data, inference engine 126 computes a current pose of system 100. For example, inference engine 126 may use landmarks within gated factor graph 150 and their associated 2D-3D coordinates included within landmark database 108 to calculate the current pose of system 100. In some examples, inference engine 126 outputs the navigation information to improve navigation accuracy for a mobile platform, such as system 100 (610).

The techniques of the disclosure may improve navigation precision by navigation systems. For example, the techniques of the disclosure may allow for the implementation of navigation systems that are more precise over conventional systems. The techniques of the disclosure may allow for a high level of accuracy required to enable deployment of technologies such as autonomous cars or other vehicles. Furthermore, using the techniques disclosed herein, navigation technologies may provide high navigational precision even in regions where the GPS signal is poor or non-existent.

Figure 7:
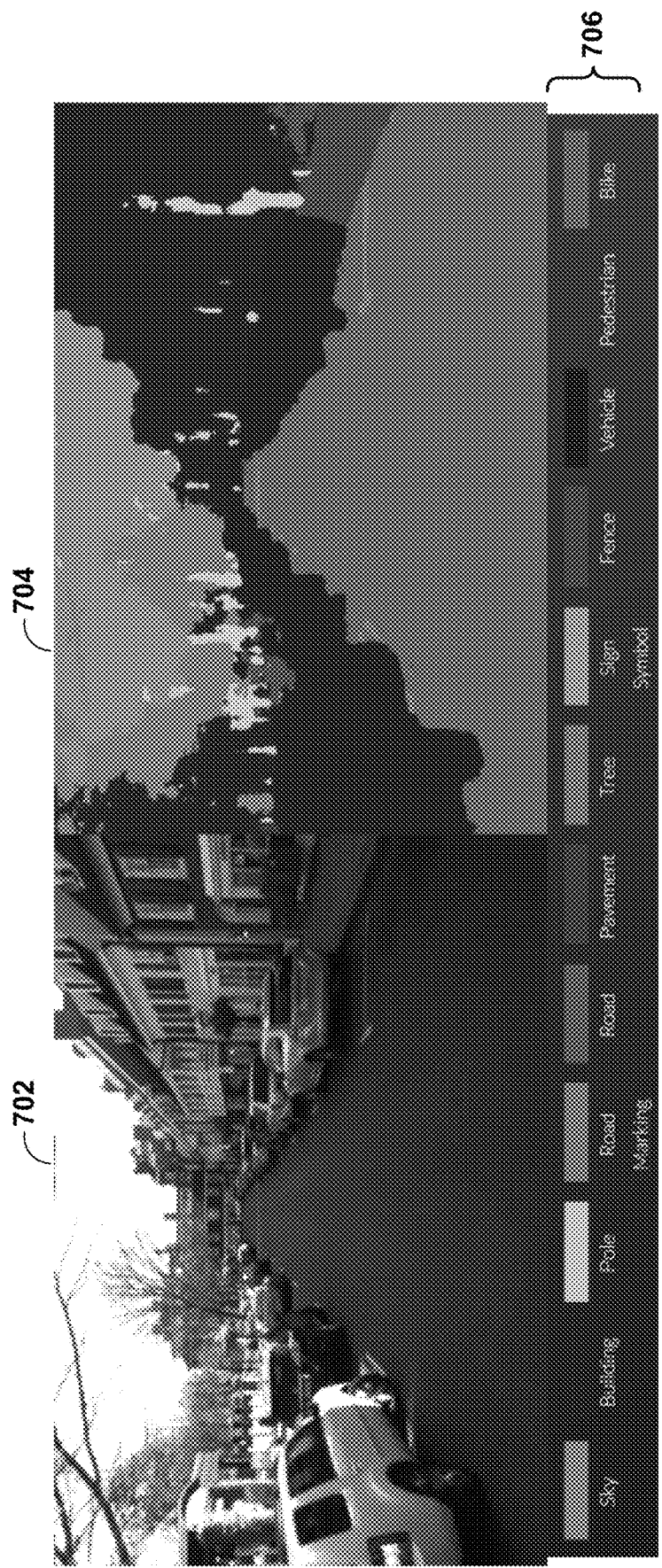
FIG. 7 is a block diagram illustrating an example of semantic segmentation of an image in accordance with the techniques of the disclosure.

FIG. 7 is a block diagram illustrating an example of semantic segmentation of an image in accordance with the techniques of the disclosure. FIG. 7 depicts an image frame 702 and a resulting segmentation 704 of image frame 702 according to a plurality of semantic classes 706. In one example, image frame 702 is generated by one of image sensors 104 of FIG. 1. In the example of FIG. 7, image frame 702 depicts a scene from a city street.

In some examples, semantic segmentation module 116 of visual odometry module 114 of FIG. 1 applies sematic segmentation to image frame 702 to generate semantically segmentation 704 of image frame 702. Semantic segmentation module 116 segments input video frames into a plurality of semantic classes 706 and may associate respective semantic labels that are associated with the semantic classes 706. In the example of FIG. 7, 12 different semantic classes 706 are used: Sky, Building, Pole, Road Marking, Road, Pavement, Tree, Sign Symbol, Fence, Vehicle, Pedestrian, and Bike. In other implementations, more, fewer, or other semantic class labels may be used.

Figure 8:
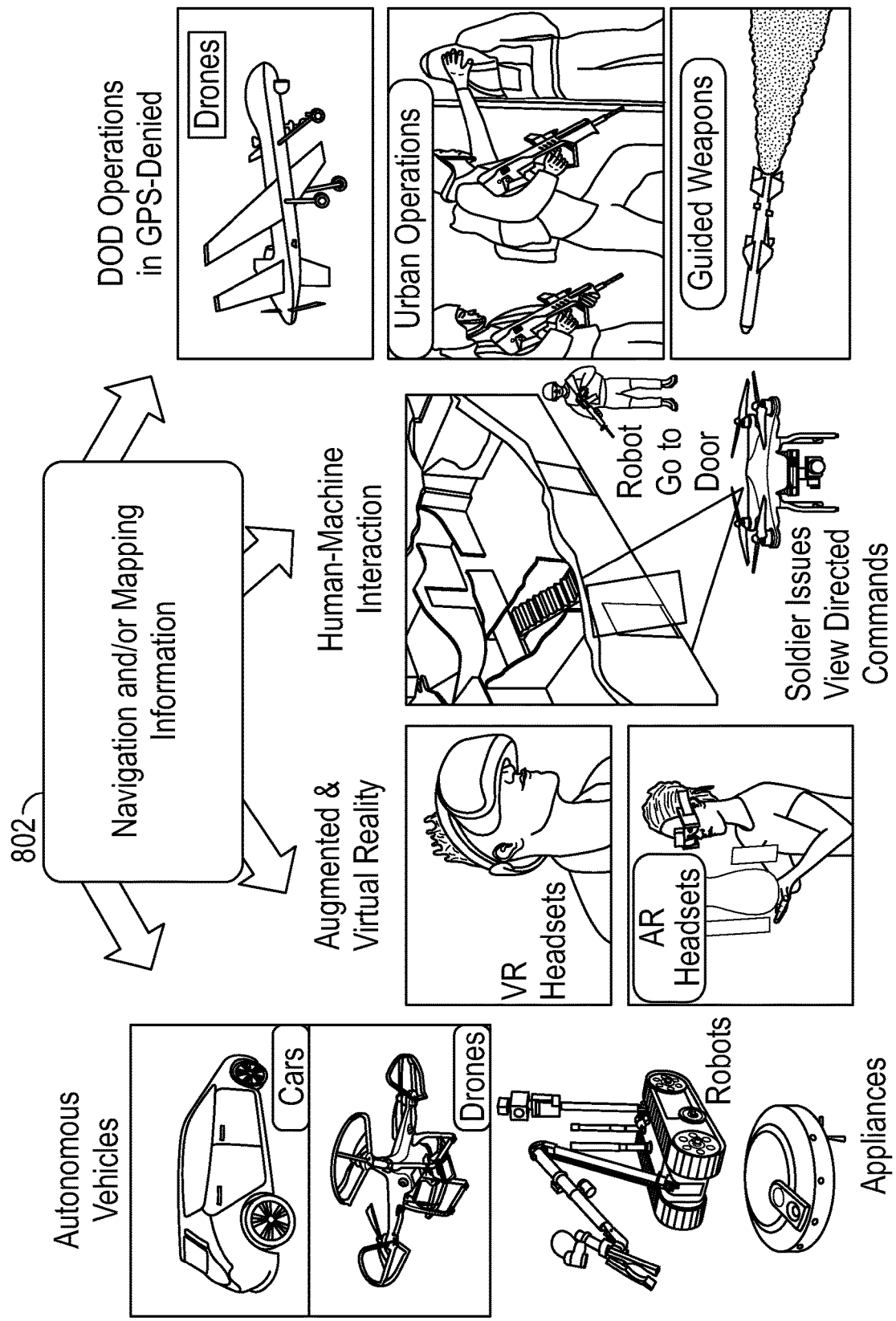
FIG. 8 is a block diagram illustrating some example uses for the techniques of the disclosure.

FIG. 8 is a block diagram illustrating some example uses for the techniques of the disclosure. In one example, inference engine 126 of FIG. 1 generates navigation and mapping information 802 by separating salient semantically segmented visual features from less-important visual features, and using only the visual features that are salient over time as constraints to generate navigation information as described above. In the example of FIG. 8, inference engine 126 may use navigation and mapping information 802 to improve navigation accuracy for a mobile platform. Such a mobile platform may include a mobile device, smartphone, laptop, virtual reality display, an augmented reality display, a human-piloted vehicle, a human-machine interface, or an autonomous vehicle, such as a robot, aerial vehicle, drone, guided weapon, or other device or system that operates at least partially autonomously. For example, a mobile platform may use navigation and mapping information 802 to improve navigation precision. For example, navigation and mapping information 802 generated using the techniques of the disclosure may allow for the implementation of navigation systems that are more precise over conventional systems. Further, navigation and mapping information 802 generated using the techniques of the disclosure may allow for a high level of accuracy required to enable deployment of technologies such as autonomous systems, including autonomous cars, drones, or other vehicles. For example, autonomous systems, robots, or self-driving vehicles may use navigation and mapping information 802 to move about in dynamic congestion without collision. Further, the techniques of the disclosure may allow for the removal of low-level features, e.g., dynamic objects, such as people and other vehicles, to ensure that navigation accuracy of the autonomous system does not suffer. Furthermore, using the techniques disclosed herein, navigation technologies may provide high navigational precision even in regions where the GPS signal is poor or non-existent, such as in military settings and guided weapons platforms. In some examples, a person may use navigation and mapping information 802 to receive navigation instructions or directions from a mobile device, such as a smartphone or laptop.

Figure 9:
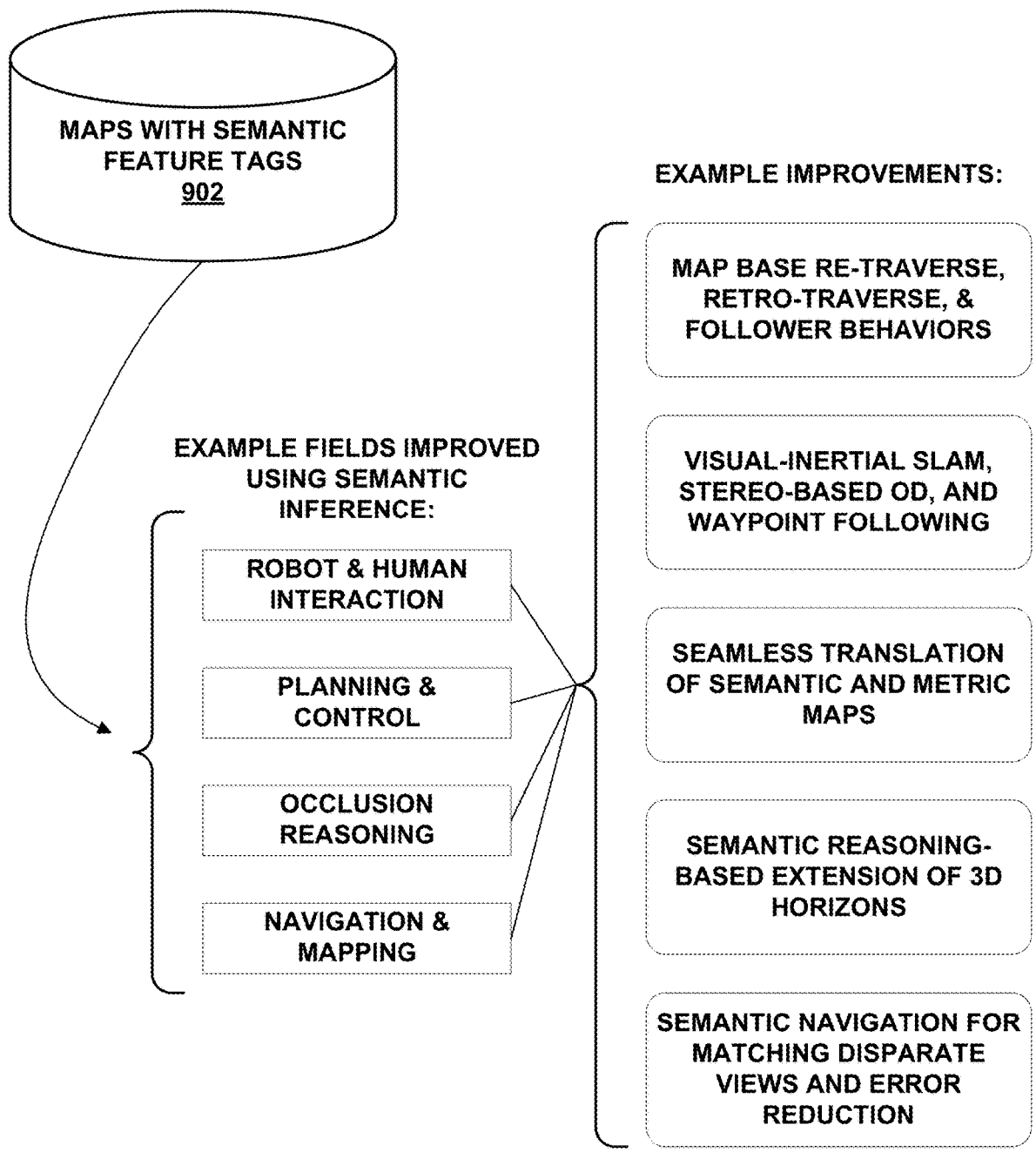
FIG. 9 is a block diagram illustrating some example improvements provided by the techniques of the disclosure.

FIG. 9 is a block diagram illustrating some example improvements provided by the techniques of the disclosure. For example, inference engine 126 of FIG. 1 generates maps with semantic feature tags 902. Maps with semantic feature tags 902, may for example, be navigation information as described above with respect to FIG. 1 or navigation and mapping information 802 as described above with respect to FIG. 8. Various applications may use maps with semantic feature tags 902 to improve navigation accuracy for a mobile platform. For example, the techniques of the disclosure may be of interested to robot and human interaction, planning and control systems, occlusion reasoning systems, and navigation and mapping applications. Such applications may benefit from the techniques of the disclosure by allowing for the removal of low-level features e.g., dynamic objects, such as people and other vehicles, from the calculation of such maps with semantic feature tags thereby allowing for increased navigation accuracy and reduced computational complexity. For example, the techniques of the disclosure may provide improvements to map base re-traversing, and retro-traversing, and follower behaviors. Further, the techniques of the disclosure may provide improvements to visual-inertial, SLAM, stereo-based obstacle detection (OD), and waypoint following, Further, the techniques of the disclosure may allow for the seamless translation of semantic-based and metric-based maps. The techniques of the disclosure may provide semantic reasoning-based extension of 3D horizons. Further, the techniques of the disclosure may allow for semantic navigation for matching disparate views and error reduction.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A navigation system comprising:
   an image sensor configured to generate a plurality of images, each image of the plurality of images comprising one or more features; and
   a computation engine executing on one or more processors and configured to process each image of the plurality of images to determine a semantic class of each feature of the one or more features of the image;
   wherein the computation engine is further configured to determine, for each feature of the one or more features of each image, whether to include the feature as a constraint in a navigation inference engine by determining, based on the semantic class of the feature, whether the feature is not static, and, in response to determining that the feature is not static, excluding the feature as a constraint in the navigation inference engine,
   wherein the computation engine is further configured to generate, based at least on features of the one or more features included as constraints in the navigation inference engine, navigation information, and
   wherein the computation engine is further configured to output the navigation information to improve navigation accuracy for a mobile platform.

2. The system of claim 1,
   wherein the navigation inference engine comprises a factor graph of feature information,
   wherein to determine whether to include the feature as a constraint in the navigation inference engine, the computation engine is configured to determine whether to include the feature as a factor in the factor graph of feature information, and
   wherein to generate, based at least on features of the one or more features included as constraints in the navigation inference engine, the navigation information, the computation engine is further configured to generate, based at least on features of the one or more features included as factors in the factor graph of feature information, the navigation information.

3. The system of claim 1,
   wherein the navigation inference engine comprises an extended Kalman filter of feature information,
   wherein to determine whether to include the feature as a constraint in the navigation inference engine, the computation engine is configured to determine whether to include the feature as a constraint in the extended Kalman filter of feature information, and
   wherein to generate, based at least on features of the one or more features included as constraints in the navigation inference engine, the navigation information, the computation engine is further configured to generate, based at least on features of the one or more features included as constraints in the extended Kalman filter of feature information, the navigation information.

4. The system of claim 1,
   wherein the navigation inference engine comprises a fixed-lag smoother of feature information,
   wherein to determine whether to include the feature as a constraint in the navigation inference engine, the computation engine is configured to determine whether to include the feature as a constraint in the fixed-lag smoother of feature information, and
   wherein to generate, based at least on features of the one or more features included as constraints in the navigation inference engine, the navigation information, the computation engine is further configured to generate, based at least on features of the one or more features included as constraints in the fixed-lag smoother of feature information, the navigation information.

5. The system of claim 1,
   wherein the navigation inference engine comprises a Bayesian graphical model of feature information,
   wherein to determine whether to include the feature as a constraint in the navigation inference engine, the computation engine is configured to determine whether to include the feature as a constraint in the Bayesian graphical model of feature information, and
   wherein to generate, based at least on features of the one or more features included as constraints in the navigation inference engine, the navigation information, the computation engine is further configured to generate, based at least on features of the one or more features included as constraints in the Bayesian graphical model of feature information, the navigation information.

6. The system of claim 1, wherein, to determine whether to include the feature as a constraint in the navigation inference engine, the computation engine is configured to determine, based on the semantic class of the feature, that the feature is static, and, in response to determining that the feature is static, the computation engine is further configured to include the feature as a constraint in the navigation inference engine.

7. The system of claim 6,
   wherein the navigation inference engine comprises a factor graph of feature information,
   wherein to include the feature as a constraint in the navigation inference engine, the computation engine is configured to include the feature as a factor in the factor graph of feature information, and
   wherein to generate, based at least on features of the one or more features included as constraints in the navigation inference engine, the navigation information, the computation engine is further configured to generate, based at least on features of the one or more features included as factors in the factor graph of feature information, the navigation information.

8. The system of claim 6,
   wherein the navigation inference engine comprises an extended Kalman filter of feature information,
   wherein to include the feature as a constraint in the navigation inference engine, the computation engine is configured to include the feature as a constraint in the extended Kalman filter of feature information, and
   wherein to generate, based at least on features of the one or more features included as constraints in the navigation inference engine, the navigation information, the computation engine is further configured to generate, based at least on features of the one or more features included as constraints in the extended Kalman filter of feature information, the navigation information.

9. The system of claim 6,
wherein the navigation inference engine comprises a fixed-lag smoother of feature information,
wherein to include the feature as a constraint in the navigation inference engine, the computation engine is configured to include the feature as a constraint in the fixed-lag smoother of feature information, and
wherein to generate, based at least on features of the one or more features included as constraints in the navigation inference engine, the navigation information, the computation engine is further configured to generate, based at least on features of the one or more features included as constraints in the fixed-lag smoother of feature information, the navigation information.

10. The system of claim 6,
wherein the navigation inference engine comprises a Bayesian graphical model of feature information,
wherein to include the feature as a constraint in the navigation inference engine, the computation engine is configured to include the feature as a constraint in the Bayesian graphical model of feature information, and
wherein to generate, based at least on features of the one or more features included as constraints in the navigation inference engine, the navigation information, the computation engine is further configured to generate, based at least on features of the one or more features included as constraints in the Bayesian graphical model of feature information, the navigation information.

11. The system of claim 6,
wherein, to process each image of the plurality of images to determine the semantic class of each feature of the one or more features of the image, the computation engine is configured to assign a semantic class to each feature of the one or more features of the image,
wherein the computation engine is further configured to determine, based on a statistical mode of the semantic classes of each feature of the one or more features of each image of the plurality of images that corresponds to a similar feature in each other image of the plurality of images, an actual semantic class of the feature, and
wherein to determine, based on the semantic class of the feature, that the feature is static, the computation engine is configured to determine, based on the actual semantic class of the feature, that the feature is static.

12. The system of claim 1, wherein, to determine whether to include the feature as a constraint in the navigation inference engine, the computation engine is configured to determine, based on the semantic class of the feature, that the feature is salient over time, and, in response to determining that the feature is salient over time, the computation engine is further configured to include the feature as a constraint in the navigation inference engine.

13. The system of claim 1,
wherein, to process each image of the plurality of images to determine the semantic class of each feature of the one or more features of the image, the computation engine is configured to assign a semantic class to each feature of the one or more features of the image,
wherein the computation engine is further configured to determine, based on a statistical mode of the semantic classes of each feature of the one or more features of each image of the plurality of images that corresponds to a similar feature in each other image of the plurality of images, an actual semantic class of the feature.

14. The system of claim 13, wherein to determine, based on the statistical mode of the semantic classes of each feature of the one or more features of each image of the plurality of images that corresponds to a similar feature in each other image of the plurality of images, the actual semantic class of the feature, the computation engine comprises a landmark matching module configured to correlate a first feature of a first image of the plurality of images to a second feature of a second image of the plurality of images.

15. The system of claim 14, further comprising a second navigation sensor system configured to generate motion data, wherein the second navigation sensor system includes at least one of a GPS unit, a camera, and an inertial measurement unit (IMU),
wherein to correlate the first feature of the first image to the second feature of the second image, the landmark matching module is configured to correlate the first feature of the first image to the second feature of the second image based on the motion data.

16. The system of claim 1, wherein the navigation information comprises a map of visual landmarks.

17. A method comprising:
generating, by an image sensor of a navigation system, a plurality of images, each image of the plurality of images comprising one or more features;
processing, by a computation engine of the navigation system and executing on one or more processors, each image of the plurality of images to determine a semantic class of each feature of the one or more features of the image;
determining, by the computation engine and for each feature of the one or more features of each image and based at least on the semantic class of the feature, whether to include the feature as a constraint in a navigation inference engine by determining, based on the semantic class of the feature, whether the feature is not static, and, in response to determining that the feature is not static, excluding the feature as a constraint in the navigation inference engine;
generating, by the computation engine and based at least on features of the one or more features included as constraints in the navigation inference engine, navigation information; and
outputting, by the computation engine, the navigation information to improve navigation accuracy for a mobile platform.

18. The method of claim 17,
wherein the navigation inference engine comprises a factor graph of feature information,
wherein determining whether to include the feature as a constraint in the navigation inference engine comprises determining whether to include the feature as a factor in the factor graph of feature information, and
wherein generating, based at least on features of the one or more features included as constraints in the navigation inference engine, the navigation information comprises generating, based at least on features of the one or more features included as factors in the factor graph of feature information, the navigation information.

19. The method of claim 17, wherein determining whether to include the feature as a constraint in the navigation inference engine comprises:
determining, based on the semantic class of the feature, that the feature is static; and in response to determining that the feature is static, including the feature as a constraint in the navigation inference engine.

20. The method of claim 17, wherein processing each image of the plurality of images to determine the semantic class of each feature of the one or more features of the image comprises:
   assigning a semantic class to each feature of the one or more features of the image; and
   determining, based on a statistical mode of the semantic classes of each feature of the one or more features of each image of the plurality of images that corresponds to a similar feature in each other image of the plurality of images, an actual semantic class of the feature.

21. The method of claim 20, wherein determining, based on the statistical mode of the semantic classes of each feature of the one or more features of each image of the plurality of images that corresponds to a similar feature in each other image of the plurality of images, the actual semantic class of the feature comprises correlating, by a landmark matching module of the computation engine, a first feature of a first image of the plurality of images to a second feature of a second image of the plurality of images.

22. The method of claim 21, further comprising generating, by at least one of a GPS unit, a camera, and an inertial measurement unit (IMU) of a second navigation sensor system, motion data,
   wherein correlating the first feature of the first image to the second feature of the second image, comprises correlating the first feature of the first image to the second feature of the second image based on the motion data.

23. A non-transitory, computer-readable medium comprising instructions that, when executed, cause one or more processors of a computation engine of a navigation system to:
   receive, from an image sensor of the navigation system, a plurality of images, each image of the plurality of images comprising one or more features;
   process each image of the plurality of images to determine a semantic class of each feature of the one or more features of the image;
   determine, for each feature of the one or more features of each image and based at least on the semantic class of the feature, whether to include the feature as a constraint in a navigation inference engine by determining, based on the semantic class of the feature, whether the feature is not static, and, in response to determining that the feature is not static, excluding the feature as a constraint in the navigation inference engine;
   generate, based at least on features of the one or more features included as constraints in the navigation inference engine, navigation information; and
   output the navigation information to improve navigation accuracy for a mobile platform.

* * * * *